United States Patent [19]

Oliker

[11] Patent Number: 4,685,938
[45] Date of Patent: Aug. 11, 1987

[54] APPARATUS AND METHOD FOR THE DETERMINATION OF SORPTION BED CHARACTERISTICS

[75] Inventor: Michael D. Oliker, Amesbury, Mass.

[73] Assignee: NERA Company, Amesbury, Mass.

[21] Appl. No.: 777,162

[22] Filed: Sep. 18, 1985

[51] Int. Cl.⁴ .......................................... B01D 53/04
[52] U.S. Cl. ...................................... 55/20; 55/163; 55/208; 55/387
[58] Field of Search .............. 55/20, 163, 179, 208, 55/387, 389; 34/46, 48; 374/110, 111, 141, 179

[56] References Cited

U.S. PATENT DOCUMENTS

| 2,535,902 | 12/1950 | Dailey, Jr. | 55/33 |
| 2,562,334 | 7/1951 | Roberts | 55/179 X |
| 2,967,429 | 1/1961 | Taylor | 374/179 X |
| 3,053,091 | 9/1962 | Braunagel | 374/179 X |
| 3,874,239 | 4/1975 | Finney | 374/179 X |
| 4,083,701 | 4/1978 | Noack | 55/20 |
| 4,164,433 | 8/1979 | Granahan et al. | 374/179 X |
| 4,218,224 | 8/1980 | Sun | 55/20 |
| 4,292,054 | 9/1981 | Noack et al. | 55/217 X |
| 4,324,564 | 4/1982 | Oliker | 55/20 |
| 4,440,509 | 4/1984 | Agarwal | 374/111 X |
| 4,477,687 | 10/1984 | Finney | 374/179 X |
| 4,479,814 | 10/1984 | Oliker | 55/208 X |
| 4,483,631 | 11/1984 | Kydd | 374/179 X |

FOREIGN PATENT DOCUMENTS

| 129520 | 1/1978 | German Democratic Rep. | 55/20 |
| 929179 | 5/1982 | U.S.S.R. | 55/20 |

Primary Examiner—Robert Spitzer
Attorney, Agent, or Firm—Lahive & Cockfield

[57] ABSTRACT

A system for the sorption treatment of fluids comprises a sorption vessel having an exterior wall, a fluid feed entrance, a fluid product exit, and an internally-disposed sorbent material bed. The system further includes an element for determining a thermal characteristic of the sorbent bed, which element comprises a sensing element for generating a signal indicative of a temperature of the sorbent vessel exterior wall, and control means for processing that temperature-representative signal. The system further comprises an output element for generating a signal indicative of the particular thermal characteristic. The system has application in improving the efficiency of adsorption vessels, solids drying apparatus, and like devices. Moreover, the system may be utilized as a diagnostic device for such apparatus.

27 Claims, 5 Drawing Figures

APPARATUS AND METHOD FOR THE DETERMINATION OF SORPTION BED CHARACTERISTICS

BACKGROUND

This invention provides a system for the determination of sorption bed characteristics. More particularly, the invention provides a method and apparatus for determining thermal characteristics of a sorption bed through the measurement of temperatures of the vessel walls which contain the bed. The invention has application in improving the efficiency of adsorption vessels, solids drying apparatus, and like devices. Moreover, the invention has application as a diagnostic device for such apparatus.

In accord with teachings of the prior art, an apparatus for the adsorption treatment of fluids typically comprises a vessel having a fluid feed entrance and a fluid product exit. Disposed within the vessel, is a sorbent material designed for reducing sorbate concentration in a feed fluid passing through the vessel. According to a conventional mode of operation, in the initial sorption stage, a fluid stream containing a dilute species to be removed, i.e, the sorbate, is introduced to the vessel via the fluid feed entrance and passed along the flow path of the bed. Inside the bed, as sorbate is removed from the fluid, a sorption wave or "front" is created which passes along the flow path in the same direction as the fluid flow, but at a much slower rate.

According to recent characterizations of sorption bed mechanisms, a sorption front is defined as the bed region where occur changes in sorbent loading and sorbate content of the fluid phase. The front's upstream side is bounded by a bed region characterized by sorbent loadings, sorbate to fluid feed mole ratios, and temperatures characteristic of equilibrium between the sorbent material and the feed. On its downstream side, the sorption front is bounded by a bed region having properties characteristic of equilibrium between the sorbent material and the substantially sorbate-free fluid product. As the downstream boundary of the sorption front approaches the bed exit, the concentration of sorbate in the product begins to rise. Front boundaries are generally not well defined, but rather comprise regions in which the specific bed and fluid characteristics asymptotically approach equilibrium.

According to the conventional techniques for the control of the sorption stage, concentration of sorbate in the product at the exit of the vessel is monitored. When this concentration exceeds some predetermined amount, sorption is discontinued, and the bed is regenerated.

In the regeneration stage, a regenerant hot fluid is passed through the bed in a co-current, or more commonly, a countercurrent direction. The high temperature of the regenerant effects a desorption front in the bed, which front drives sorbate from the sorbent material and into the flowing regenerant stream. This process is continued until the bed is substantially sorbate-free, as typically revealed by monitoring waste at the veseel exit for the emergence of substantially sorbate-free regenerant fluid.

Sorption bed systems of the type described above are known as "thermal swing" systems because they are regenerated with heat. These systems have been widely utilized in various industries. For example, in the preparation of air for use in pneumatic systems, water vapor is often first removed from the air by its passage through activated alumina or zeolite. Natural gas is similarly treated before it is liquified or delivered to a pipeline. Activated carbon can be used to remove trace quantities of organic vapors from air in solvent recovery operations. Similarly, carbon dioxide, mercury, oxides of nitrogen and sulfur, and hydrogen sulfide may be removed from air or exhaust on zeolite molecular sieves or on activated carbon. Recently, thermally regenerable ion exchange resins have been utilized for removal of salts from water.

A drawback of the conventional adsorption bed operational techniques is the requirement that sorbate concentration at the vessel exit be monitored in order to adequately control passage of fluids through the vessel. Moreover, these techniques typically treat the adsorbent bed as a "black box." That is, the status of the sorption bed or its sensitivity to variations in gas composition, temperature and flow rate are generally wholly unknown to the operator. Consequently, to insure proper operation, a considerable excess of regeneration energy and frequent desiccant changeouts are standard procedure.

In one recent advance in sorption bed technology, Oliker, U.S. Pat. No. 4,324,564, discloses the modification of the cycle of operation of beds of thermal swing systems. In accord with the technique of that patent, it is possible to significantly reduce the quantity of head needed for regeneration, to increase the throughput of a bed of a given size, to decrease the size and thus the capital costs of a bed system required to achieve a given capacity, to upgrade the quality of the reduced sorbate-concentration product, and to provide greater security against break-through of feed during the sorption stage. The teachings of that patent are expressly incorporated by reference herein.

More particularly, the U.S. Pat. No. 4,324,564 discloses the "Four Front" method. As disclosed therein, regeneration of sorption beds occurs through the medium of moving fronts or regions in the sorption bed where changes in sorbent loading, temperature, and sorbate content of the gas occur. During regeneration, introduction of a hot gas stream into the bed creates a desorption front. This front, designated as an RW front, is bounded on its downstream side by bed conditions characteristic of equilibrium between the sorbent material and fluid waste ("W", sorbate-rich effluent"), and on its upstream side by bed conditions characteristic of equilibrium between the hot sorbent material and hot regenerant gs ("R"). Upon subsequent introduction of cooling fluid, another front is created, designated therein as a thermal front or a "PR" front, which moves more rapidly than the RW front. The thermal front can arise in several ways. When the hot regenerant gas contains a substantial concentration of sorbate (e.g., water) and the coolant is substantially sorbate-free (assumed for purposes of discussion to have characteristics similar to dry product gas "P"), a PR transition is created comprising a faster stripping front which effects removal of all or most of the sorbate on the hot bed in equilibrium with the hot regenerant fluid, and a thermal front which effects the major temperature transition. Upstream of this transition, the bed is in equilibrium with coolant (herein designated "P"), while downstream, the bed is in equilibrium with hot regenerant. If sorbate is present in the coolant, multiple fronts are produced which together form the PR transition, including one front which constitutes the major thermal front. When the regeneration and cooling are conducted using substantially sorbate-free gas, the PR transition is a pure thermal wave bounded on its downstream side by bed conditions characteristic of equilibrium between the sorbent and the hot regenerant gas, and on its upstream side by bed conditions characteristic of equilibrium between the sorbent and the cooling gas.

U.S. Pat. No. 4,324,564 discloses that a number of operational advantages including energy savings can be achieved by timing the introduction of the cooling gas prior to the breakthrough of the midpoint of the RW front. The preferred operation of the Four Front method for sorption bed regeneration introduces the cooling gas so that the thermal component of the PR transition will be in the last third of the bed or most preferably at the bed exit when the slower RW front is at or breaking through the bed exit.

In a relatd development, copending U.S. patent application Ser. No. 484,159, filed Apr. 12, 1983, commonly assigned herewith, discloses a method and apparatus for drying granular solids. In accord with the teachings of that application, a heated gas stream is directed through a volume of solids and followed by a cooling gas stream. Through alteration of the timing of the introduction of the cooling stream, with respect to that timing utilized in conventional drying techniques, the solids drying mechanism efficiently uses the sensible heat contained in the solids to supply heat of evaporation. The teachings of U.S. patent application Ser. No. 484,159 are incorporated herein.

The above-described work of Oliker provides inroads into obviating deficiencies of the prior art sorption technology. For example, in lieu of the standard practice of controlling fluid passage through the monitoring of sorbate concentration, Oliker utilizes a temperature sensing device placed within the sorbent bed. By enabling detection of the passage of fronts through the bed, these internal temperature sensors lead to improvements in bed efficiency and longevity.

An object of the present invention is to provide still further advances in the art of sorption bed operation. More particularly, an object of the invention is to provide a mechanism for monitoring sorption bed characteristics, e.g., thermal characteristics, without necessitating the placement of internal probes, e.g., either within the bed fluid exit or within the sorption bed itself. Another object is to provide a simple bed monitoring mechanism which can be retrofit on existing adsorption treatment apparatus without requiring substantial modification thereof. Still another object is to provide a sorption apparatus which does not require the frequent down-time typically caused by prematurely aged sorption beds. Further, an object of the invention is to obviate the necessity for the over-design of sorption apparatus. Other objects of the invention are evident in the discussion below.

SUMMARY OF THE INVENTION

The above objects are provided by the invention which in one aspect provides an apparatus for the sorption treatment of fluids. The apparatus comprises a sorption vessel having an exterior wall, a fluid feed entrance, and a fluid product exit. A sorbent material bed is disposed within the vessel and is in thermal communication with the vessel's exterior wall. The sorbent material is of the type described above and is suitable for reducing sorbate concentration in a feed fluid passing therethrough. The apparatus includes an element for determining a thermal characteristic, e.g., temperature, of the sorbent material. This element includes a sensing element for generating a signal indicative of a temperature of the exterior wall and control means for processing that temperature-representative signal. Further, the adsorption treatment apparatus includes an output element for generating a signal indicative of the thermal characteristic.

In other aspects, the invention provides an apparatus of the type described above in which the temperature of the exterior wall is determined by temperature sensing devices, e.g., thermocouples, disposed on the vessel exterior wall. In one particular aspect, the apparatus comprises plural temperature sensing devices circumferentially disposed about the perimeter of the vessel, i.e., "circumferentially-disposed" sensing elements. In another related aspect, the invention provides an apparatus in which plural temperature sensing devices are axially disposed on the exterior wall.

The invention comprises in other aspects adsorption treatment apparatus of the type described above, including elements for monitoring the time-wise variation of vessel wall temperature; for monitoring temperatures of an insulating medium, e.g., calcium silicate coating or a boundary layer of air, disposed about the vessel wall; and, for monitoring axial variation of the vessel wall temperature. These elements facilitate the determination of heat storage in the vessel wall, heat transfer to the insulating medium, and axial heat conduction in the wall, respectively.

According to another aspect of the invention, an adsorption treatment apparatus of the type described above includes a first processing element for generating a signal indicative of heat storage in the exterior vessel wall. This element includes a further element for generating a signal representative of a sorbent bed temperature $T_M$ having a numerical value expressed according to the mathematical relation $$T_M = (\rho(th_v)C_{pv}/h_v) * dT_v/dt + T_v$$

wherein
- $\rho$ is defined as a density of the vessel exterior wall,
- $th_v$ is defined as a thickness of the vessel exterior wall,
- $C_{pv}$ is defined as a specific heat capacity of the vessel exterior wall,
- $h_v$ is defined as a heat transfer coefficient of the vessel exterior wall,
- $T_v$ is defined as a temperature of the vessel exterior wall, and
- $dT_v/dt$ is defined as a time-wise variation of the exterior wall temperature.

In a related aspect, the invention is characterized by an adsorption treatment apparatus which includes a processing element for generating a signal representative of a quantity of heat transfer between the vessel exterior wall and the insulating medium. This element comprises an element for generating a signal representative of a sorbent material temperature $T_M$ calculated as above and further including a heat loss term $$(h_{insul}/h_v)*(T_v - T_{insul})$$

wherein
- $h_{insul}$ is defined as a heat transfer coefficient of the insulating medium, and $T_{insul}$ is defined a temperature of the insulating medium.

According to still further aspects of the invention, an adsorption treatment apparatus includes an element for generating a signal representative of exterior wall axial heat conduction, i.e., heat transfer between adjacent thermally communicative sections of the exterior wall. This element includes an element for generating a signal representative of sorbent bed temperature $T_M$ as calculated above and further including an axial conduction term $$-((th_v)k_v)k_v/h_v)*d^2T_v/dx^2$$

wherein $k_v$ is defined as a heat conductivity coefficient of the exterior wall, and $d^2T_v/dx^2$ is defined as an axial variation in an axial rate of change of temperature of the exterior wall.

According to other aspects of the invention, there is provided a method for operating a sorption treatment apparatus of the type described above and including processing steps parallelling the aforementioned elemental functions.

One feature of a sorption system constructed in accord with the invention is the capability to closely monitor sorption bed characteristics without the use of internal probes. Another feature of the invention is that the system can be easily retrofit onto existing sorption apparatus. Further, the invention permits the modification of existing sorption apparatus to operate the Four Front method. Still further, the invention permits diagnosis of sorption bed loading characteristics and dysfunction and thereby permits the reduction of apparatus down-time and over-design.

BRIEF DESCRIPTION OF THE DRAWING

The aforementioned and other objects and features of the invention are apparent in the following description of preferred embodiments of the invention and from the drawing, wherein like reference characters in the respective drawn figures includes corresponding parts. In the drawing.

DETAILED DESCRIPTION

Figure 1:
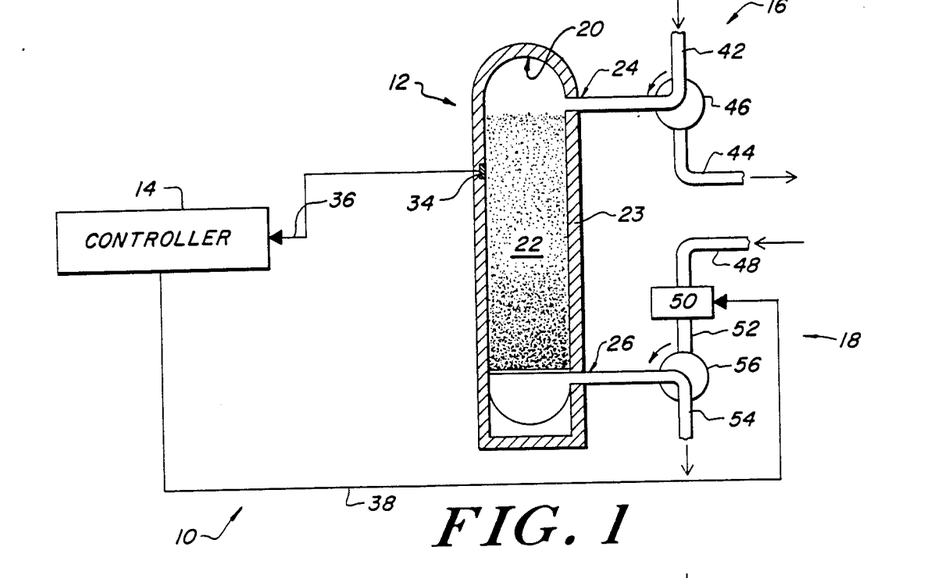
FIG. 1 is a schematic illustration of an embodiment of the invention including a single temperature sensing device.

FIG. 1 depicts an adsorption treatment apparatus according to one embodiment of the invention. The illustrated apparatus 10 comprises a sorption vessel 12, a controller 14, an upper intake section 16, and a lower intake section 18. Vessel 12 includes an exterior wall 20 containing a sorbent material bed 22 and surrounded by an insulating medium 23, e.g., a calcium silicate coating or a boundary layer of air. The vessel 12 also includes a fluid feed port 24 and a fluid product port 26.

Controller 14 is arranged for controlling the operation of elements of apparatus 10, for example, that of a regenerant fluid heater. In the illustrated embodiment, controller 14 is connected with a temperature sensing device 34, e.g., a thermocouple, via electrode line 36. The sensing device 34 is disposed on vessel exterior wall 20 and is in thermal communication therewith. In a preferred practice for utilization of a sole temperature sensing device 34, that device is positioned between the ports 24 and 26 to provide accurate monitoring of fronts travelling through the bed 22. In particular, the sole sensing device is positioned, for example, in a manner which permits the detection of frontal movement as discussed fully in U.S. Pat. No. 4,324,564. Controller 14 is further arranged for controlling operation of regenerant fluid heat 50 through the transmission of control signals for turning the heater on or off, via line 38.

Upper intake section 16 includes feed fluid intake 42 and regenerant fluid exit 44. Intake 42 and exit 44 are placed in selective fluid communication with vessel input 24 by action of valve 46, which can be controlled by controller 14 or controlled in a conventional manner of the art. Lower intake section 18 includes regenerant fluid input 48, heater 50, and fluid lines 52 and 54. Lines 52 and 54 are placed in selective fluid communication with vessel port 26 through action of valve 56, which can be controlled by controller 14 or controlled in a conventional manner of the art.

In a sorption stage of operation, a fluid stream containing a dilute species to be removed, e.g., a sorbate, is introduced to sorption vessel 12 through routing action of port 42, valve 46, and port 24. Upon entering the vessel 12, the feed fluid passes through the sorbent bed 22, whereupon sorbate is removed from the fluid. Fluid product emerging from the bed exits the vessel at port 26. From there, the product is routed for further processing via valve 56 and line 54.

Following the sorption stage, the sorption bed 22 is regenerated by treatment with a heated regenerant fluid. This regenerant is supplied to heater 50 via line 48. The heater, in concurrence with a "heater on" control signal from controller 14, heats the regenerant prior to its passage to vessel port 26, via line 52 and valve 56. Upon passing through the bed 22, the regenerant drives sorbate from the sorbent material and into the flowing regenerant stream. The stream emerges from the vessel at port 24, and thereafter passes to regenerant exit 44, via valve 46.

Control of the heater 50 is effected by controller 14, which responds to signals generated by thermal sensing device 34 as being representative of a temperature of the exterior vessel wall 20. These signals are processed by controller 14 to determine a temperature of the sorption bed 22 along an internal fluid flow path. Upon calculating the sorption bed temperature, the controller 14 sends "heater on" and "heater off" signals to heater 50, in accord with operational characteristics of the adsorption apparatus 10. For example, where apparatus 10 is arranged for operation according to the aforementioned Four Front method, controller 14, e.g., sends signals to turn the heater off—and thereby to pass a cooling regenerant fluid—so that the thermal component of the PR transition will be in the last third of the bed, or most preferably at the bed exit, when the RW front is at or breaking through the bed exit.

According to one embodiment of the invention, an internal temperature of sorption bed 22 temperature is determined according to heat storage in the exterior vessel wall 20, as measured in part by thermocouple 34. In this embodiment, a signal representative of the sorbent material temperature $T_M$ is generated by processing signals representative of the vessel wall temperature, the time-wise rate of change thereof, and other installation dependent parameters. More particularly, the sorbent bed temperature is calculated according to the mathematical relation $$T_M = (\rho(th_v)C_{pv}/h_v) * dT_v/dt + T_v$$

wherein $\rho$ is defined as a density of the vessel exterior wall 20, $th_v$ is defined as a thickness of the exterior wall 20, $C_{pv}$ is defined as a specific heat capacity of the exterior wall 20, $h_v$ is defined as a heat transfer coefficient of the exterior wall 20, $T_v$ is defined as an exterior wall temperature as measured by thermocouple 34, and $dT_v/dt$ is defined as a time-wise variation of temperature as measured by thermocouple 34.

Values for the parameters $\rho$, $th_v$, and $C_{pv}$ are known. A value for the parameter $h_v$ may be determined either empirically or from theoretical considerations. The former method is considered preferential as it permits a determination of the value in the vicinity of the externally-mounted temperature sensing device. The method involves passing a constant-temperature fluid through the sorption bed 22 to effect a constant, known temperature therein. The method further involves monitoring the vessel wall temperature $T_v$ and its rate of change with respect to time $dT_v/dt$, to determine the factor $$(\rho(th_v)C_{pv}/h_v)$$

graphically. This graphic determination is made by measuring the slope of the curve $dT_v/dt$ vs. $T_v$, following elimination of the constant bed temperature offset term $T_M$. According to a preferred initialization practice, this graphical solution is sought subsequent to bringing the sorbent bed 22 to the regenerant temperature and sampling the vessel temperature $T_v$ in 15 second intervals.

Figure 2:
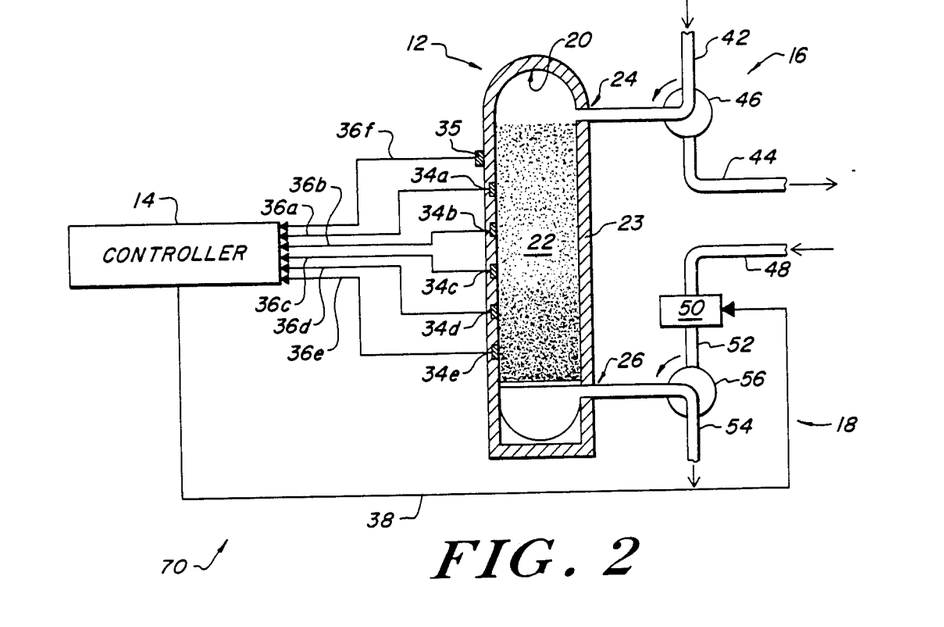
FIG. 2 is a schematic illustration of an embodiment of the invention utilizing multiple axially-disposed temperature sensing devices.

FIG. 2 depicts a preferred adsorption apparatus constructed in accord with the invention. As indicated by like reference numerals, the architecture of the illustrated apparatus 70 is similar to that of apparatus 10, described above. Unlike apparatus 10, apparatus 70 includes multiple temperature sensing elements. Temperature sensing devices 34a, 34b, 34c, 34d, and 34e are axially disposed, i.e., positioned along a fluid flow axis, on exterior wall 20 for determining temperatures thereof. In a preferred practice, eight axial sensing devices are spaced apart equidistantly along the vessel wall 20, in the region between the port 24 and the port 26. These devices 34a–34e are connected with controller 14 via electrode lines 36a–36e, respectively.

Apparatus 70 further includes temperature sensing device 35 disposed on insulating medium 23 for determining the temperature thereof. In a preferred practice employing a single insulation temperature sensing device, the device 35 is disposed on the insulation in the region of the upper third of the bed 22. In a practice employing multiple insulation temperature sensing devices, eight devices are spaced apart equidistantly along the vessel wall 20, in correspondence with the positioning of sensing elements 34a–34e. Device 35 is connected with controller 14 via electrode line 36f. In an embodiment in which the insulating material is air, electrode 35 is positioned for measuring the temperature of the ambient air adjacent the vessel wall 20.

A controller 14 for apparatus 70 may determine a sorption bed 22 temperature corresponding to wall 20 temperature-representative signals received from each of sensing device 34a–34e in accord with the above equation. In another practice, the controller 14 may derive sorption bed 22 temperatures through calculation and generation of a signal representative of heat transfer from the exterior wall 20 to the insulating medium (or ambient air) 23. This heat transfer-representative signal may be incorporated in the above equation to produce the relation $$T_M = (\rho(th_v)C_{pv}/h_v)*dT_v/d + (h_{insul}/h_v)*(T_v - T_{insul}) + T_v$$

where $h_{insul}$ is defined as a heat transfer coefficient of the insulating medium 23, and $T_{insul}$ is defined as a temperature of the insulating medium 23.

According to still another preferred embodiment, the controller 14 derives the sorption bed 22 temperature by generating a signal representative of the axial heat conduction in the exterior wall 20, i.e., a signal representative of conduction between the thermally communicative sections of the wall 20. This signal is interpreted as a further term in the above equation, thereby producing a relation as follows $$T_M = (\rho(th_v)C_{pv}/h_v)*dT_v/dt + (h_{insul}/h_v)*(T_v - T_{insul}) - ((th_v)k_v/h_v)*d^2T_v/dx^2 + T_v$$

wherein $k_v$ is defined as a constant of heat conduction of the exterior wall 20, and $d^2T_v/dx^2$ is defined as an axial variation of an axial rate of change of a temperature of exterior wall 20.

As above, values for the parameters $\rho$, $th_v$, and $C_{pv}$ are known. Additionally, a value for the parameter $h_{insul}$ is known. A value for the parameter $h_v$ may be determined from theoretical considerations, or it may be determined empirically. Again, an empirical determination is considered preferential. Moreover, to insure accuracy, each temperature sensing element is initialized separately, i.e., a parameter for each such element is determined individually for the element. According to a preferred empirical determination, the sorbent bed 22 is brought to constant, known temperature through passage of fluid therethrough. Upon stabilization of bed temperature, a graphical determination of the parameter $h_v$ is carried in a manner similar to that outlined above; to wit, a graphical determination is made of the slope of the curve $(T_v - T_{insul})$ vs. $(\rho(th_v)C_{pv}dT_v/dt + (th_v)k_vd^2T_v/dx^2)$.

Figure 3:
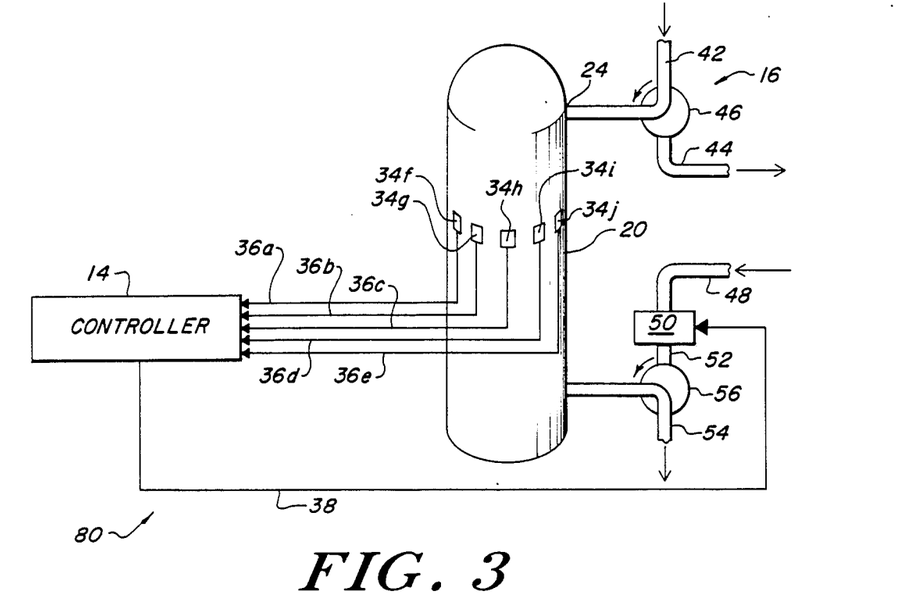
FIG. 3 is a schematic illustration of an embodiment of the invention utilizing multiple circumferentially-disposed temperature sensing devices.

FIG. 3 depicts a further adsorption apparatus constructed in accord with the invention. As indicated by like reference numerals, the architecture of the illustrated adsorption apparatus 80 is similar to that of apparatus 10 and 70, described above. Unlike those apparatus, apparatus 80 includes multiple temperature sensing devices 34f, 34g, 34h, 34i, and 34j "circumferentially" disposed about the perimeter of exterior wall 22 in positions substantially equidistant along a fluid flow path in the sorption bed (not shown). The temperature sensing devices 34f-34j generate signals representative of temperatures of exterior wall 20 at the position upon which each device is disposed. These temperature-representative signals are transmitted from the devices to controller 14 via electrode lines via lines 36a-36e, respectively.

As above, apparatus 80 can include a vessel thermocouple mounted in thermal communication with insulating material (not shown). Moreover, the apparatus 80 can include —in addition to circumferentially-disposed thermocouples—axially-disposed thermocouples of the type illustrated in apparatus 70 of FIG. 2.

Figure 4:
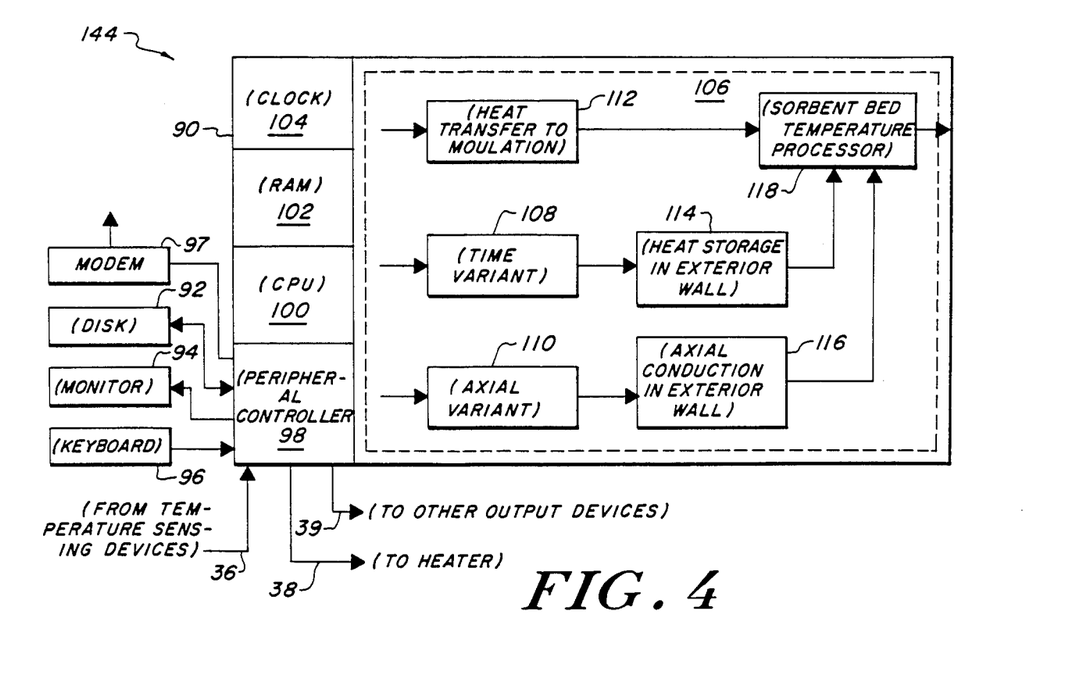
FIG. 4 is a schematic illlustration of a controller for use in practice of the invention; and, FIG. 5 depicts the graphic illustration of sorption bed loading in a manner provided by an embodiment of the invention.

FIG. 4 depicts an architecture of a controller used for practice of the invention. From the hardware perspective, the controller 14 comprises a computer 90 which is connected to data processing peripheral units, including a disk drive 92, a monitor 94, a keyboard 96, and a modem 97. The disk drive 92 serves as a non-volatile storage element for information accessed by computer 90. The monitor 94 and the keyboard 96 provide an interface between the computer 90 and the user. Specifically, the monitor 94 presents a graphic display of signals generated by computer 90, while keyboard 96 converts typed messages into computer-readable form. The modem 97 provides a communications link between an external data collection source and the controller 14 and, more particularly, the computer 90.

The illustrated computer 90 includes functional units comprising a peripheral controller 98, a central processing unit 100, a random access unit 102, and a clock 104. The peripheral control unit 98 is an interface between the computer 90 and its peripheral units, including disk drive 92, monitor 94, keyboard 96, and modem 97. The peripheral controller 98 is also utilized for interfacing sorption apparatus elements, e.g., the temperature sensing devices, connected via electrode lines 36, and the regenerant heater (element 50, FIGS. 1-3) or other devices, via lines 38 and 39, respectively.

The central processing unit 100 serves as the primary source of control, arithmetic, and logic operations within the computer 90. The random access memory unit 102 provides volative, rapid-access storage for the computer 90 and, particularly, for the central processing unit 100. Further, the clock 104 provides timing signals for the computer functional units and, as indicated below, for various software components of the controller 14.

The illustrated computer hardware used for practice of the invention can be selected from any one of many commercially available programmable digital computers. Further, the peripheral controller 98 can be adapted according to conventional interfacing techniques to provide control signals required for operational control of sorption apparatus components.

FIG. 4 additionally depicts a software environment within controller 14 and for practice of the invention. The controller software 106 operates within the computer 90, and primarily under the control of central processing unit 100. In addition to the calculation and generation of signals representative of sorption bed temperatures, as discussed below, the software 106 operates in conjunction with the peripheral controller 98 to control the adsorption apparatus as required by the particular demands of an installation. For example, the software 106 can be designed to monitor the sorption bed temperature to determine a cut-off point for a regenerant fluid heater.

The software 106 includes a time variant module 108, an axial variant module 110, a heat transfer module 112, a heat storage module 114, an axial conduction module 116, and a sorbent bed temperature module 118. The time variant module 108 determines a variation with respect to time of sorption vessel exterior wall temperature. As input, this module accepts both a signal representative of an exterior wall temperature at a sensing device and a signal representative of time increments. This latter signal can be provided, for example, by clock 104, or a suitable real-time clock. Output of the time variant module 108, representative of the aforementioned term $dT_v/dt$, is directed to heat storage module 114.

Axial variant module 110 calculates variations in exterior wall temperatures with respect to distance along the fluid flow axis. As input, this module accepts signals representative of an exterior wall temperature at each sensing device. The module accepts, as further input, a signal representative of distances between these axially disposed sensing devices. Output from the axial variant module 110, representative of the aforementioned term $d^2T_v/dx^2$, is directed to axial conduction module 116.

Heat transfer module 112 calculates an amount of heat transfer from the exterior wall of the sorption vessel to the surrounding insulating medium or ambient air. As input, the module 112 accepts signals representative of both the temperature of the exterior wall and the temperature of the insulation. The module accepts, as further input, signals representative of the aforementioned parameters $h_{insul}$ and $h_v$. Output of the module 112, representative of the term $(h_{insul}/h_v)*(T_v-T_{insul})$, is directed to the sorbent bed temperature processor 118.

The heat storage module 114 calculates an amount of heat storage in the exterior wall of the sorption vessel. The module accepts as input a signal representative of the time variant of the vessel wall temperature, i.e., $dT_v/dt$. The module accepts as further input, the vessel wall temperature $T_v$, and signals representative of the parameters $\rho$, $(th_v)$ $C_{pv}$, and $h_v$. Output from the module 114, representative of the aforementoined term $\rho(th_v)C_{pv}/h_v*dT_v/dt+T_v$, is directed to the sorbent bed temperature processor 118.

The axial conduction module 116 calculates heat transfer between adjoining thermally communicative sections of the sorption vessel wall. The module accepts as input the axial variant temperature-representative signal, i.e., $d^2T_v/dx^2$. The module 116 also accepts as input signals representative of the aforementioned parameters $(th_v)$, $h_v$, and $k_v$. Output of the module 116, representative of the term $-((th_v)k_v/h_v)*d^2T_v/dx^2$, is directed to the sorbent temperature processor 118.

The sorbent bed temperature processor 118 generates a signal representative of a temperature of the sorbent bed. As input, the module accepts signals representative of heat storage in the sorption vessel exterior wall, heat transfer to the insulating material surrounding that wall, and axial heat conduction within the wall. These terms are summed, in accord with the equations discussed above, to produce an output signal for further utilization within the controller 14 and, more particularly, the computer 90.

The sorption bed-representative temperatures produced by processor 118 may be displayed on monitor 94 or any other display device, e.g., a graphic plotter, or may be utilized to control the adsorption apparatus components, e.g., the regenerant fluid heater. In one embodiment employed in an apparatus operating according to the Four Front method, for example, the bed temperature is monitored by computer 90 software to effect the transmission of a "heater off" signal during the regeneration stage, so that the thermal component of the PR transition will be in the last third of the bed, or most preferably at the bed exit, when the RW front is at or breaking through the bed exit.

In another embodiment, the computer 90 generates a graphical display of sorption bed temperatures, or deteriminants therefrom (e.g., bed heat flow rates), over a portion of the bed fluid flow path. From these displays, thermal and loading characteristics of the bed can be determined. More particularly, a graphical display of bed characteristics permits determination of bed dysfunction, including aging, agglomeration, channelling, attrition and dusting, sliming and coking, among others.

Figure 5:
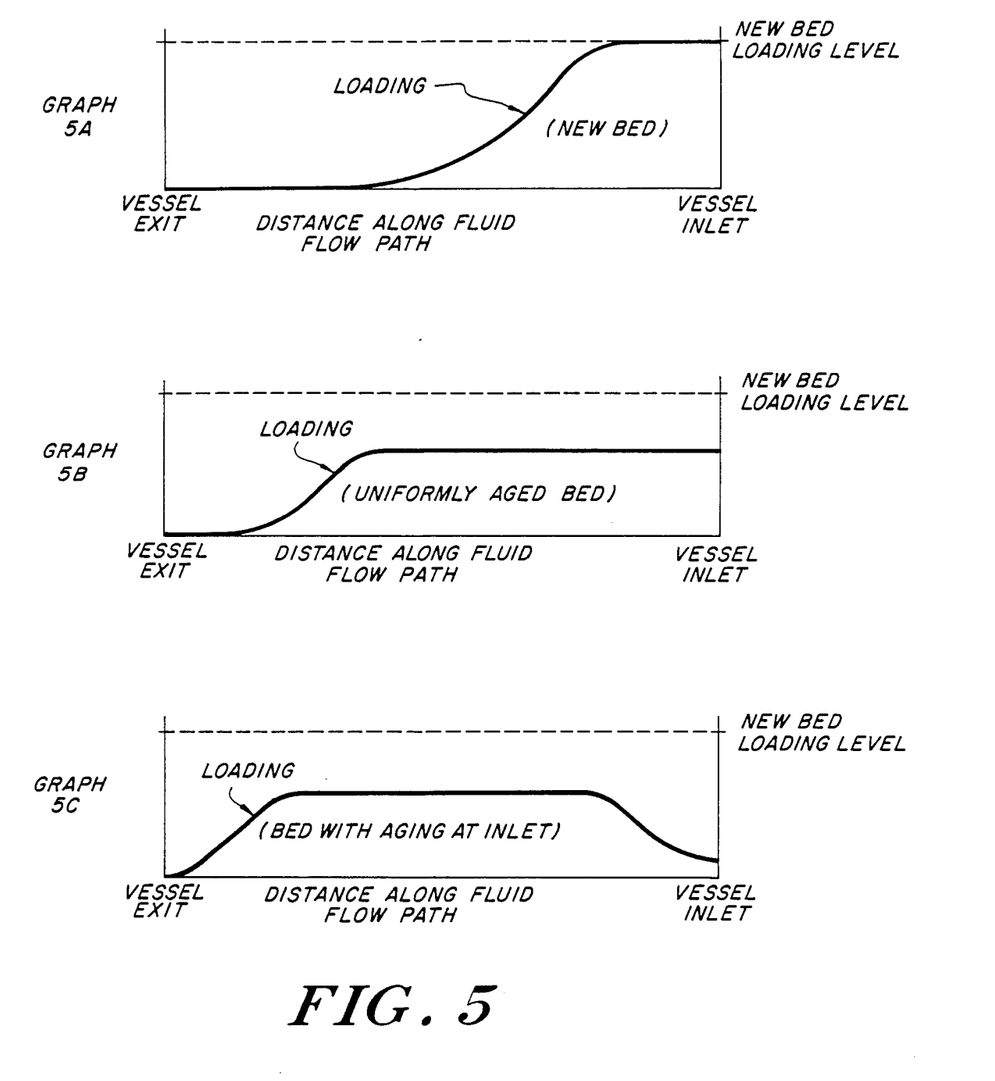

Graphical display of the type afforded by the aforementioned embodiment is shown in FIG. 5. Graphs 5A, 5B, and 5C show variation in sorbent bed loading as effected by variation in the condition of the bed. In each graph, the total amount of sorbed material is the same, i.e., the areas under the loading curves are equivalent. Graph 5A illustrates a loading profile determined in accord with the thermal characteristics of a new sorption bed. The profile reveals a high level of loading in the region of the bed near the vessel inlet. This loading decreases along the fluid flow path of the bed, as illustrated. Graph 5b illustrates a loading profile indicative of the uniform aging of a sorption bed. In contrast with that of a new bed, a moderate level of loading is seen to extend with uniformity over a greater region of the bed's fluid flow path. Further, FIG. 5C illustrates the effects of inlet aging on the loading profile. Here, a low level of loading is shown in the region of the bed near the vessel inlet and outlet. This loading increases to a moderate level in the middle regions of the fluid flow path.

Other modifications, delections, and additions to the illustrative embodiments of the invention may be made to those skilled in the art without departing from the spirit and scope of the invention, which is set forth in the following claims.

I claim:

1. In a method of operating a sorption treatment apparatus, said apparatus including a sorption vessel having an exterior wall, a fluid feed entrance, and a fluid product exit, said sorption vessel having a sorbent material disposed in an interior fluid flow path defined by said feed entrance and said product exit, said sorbent material being in thermal communication with said exterior wall, said sorbent material being of the type used for the reduction of sorbate concentration in a feed fluid, said method including cycling the sorbent material through a sorption stage, wherein a feed fluid is passed through the material and a fluid product of reduced sorbate concentration is collected at the product exit, and a thermal regeneration stage, wherein a regenerant fluid is passed through the material to produce a fluid waste of greater sorbate concentration, the improvement comprising
generating a signal representative of a temperature of said exterior wall,
processing said exterior wall temperature-representative signal to determine therefrom a thermal characteristic of sorbent material in an interior region along said fluid flow path, and
generating a signal representative of said thermal characteristic.

2. In a method according to claim 1, the further improvement comprising generating signals representative of temperatures of plural circumferentially-disposed sections of said exterior wall.

3. In a method according to claim 1, the further improvement comprising generating signals representative of temperatures of plural axially-disposed sections of said exterior wall.

4. In a method according to claim 1, the further improvement comprising generating a signal indicative of a time-wise variation of a temperature of said exterior wall.

5. In a method according to claim 4, the further improvement comprising generating a signal indicative of a quantity of heat storage in said exterior wall.

6. In a method according to claim 5, the further improvement comprising generating a signal indicative of a sorbent material temperature $T_M$ having a numerical value expressed according to the mathematical relation $$T_M = (\rho(th_v)C_{pv}/h_v) * dT_v/dt + T_v$$

wherein
$\rho$ is defined as a density of said exterior wall,
$th_v$ is defined as a thickness of said exterior wall,
$C_{pv}$ is defined as a specific heat capacity of said exterior wall,
$h_v$ is defined as a heat transfer coefficient of said exterior wall,
$T_v$ is defined as an exterior wall temperature, and
$dT_v/dt$ is defined as a time-wise variation of an exterior wall temperature.

7. In a method according to claim 5, the further improvement comprising generating a signal indicative of a temperature of an insulating medium disposed about said exterior wall and in thermal communication therewith.

8. In a method according to claim 7, the further improvement comprising generating a signal indicative of a quantity of heat transfer between said exterior wall and said insulating medium.

9. In a medium according to claim 8, the further improvement comprising generating a signal representative of a sorbent material temperature $T_M$ having a value expressed according to the mathematical relation $$T_M = (\rho(th_v) C_{pv}/h_v)*dT_v/dt + (h_{insul}/h_v)*(T_v - T_{insul}) + T_v$$

wherein
$\rho$ is defined as a density of said exterior wall,
$th_v$ is defined as a thickness of said exterior wall,
$C_{pv}$ is defined as a specific heat capacity of said exterior wall,
$h_v$ is defined as a heat transfer coefficient of said exterior wall,
$h_{insul}$ is defined as a heat transfer coefficient of said insulating medium,
$T_v$ is defined as an exterior wall temperature,
$T_{insul}$ is defined as a temperature of said insulating medium, and
$dT_v/dt$ is defined as a time-wise variation of an exterior wall temperature.

10. In a method according to claim 5, the further improvement comprising generating a signal indicative of an axial variation of temperature of said exterior wall.

11. In a method according to claim 10, the further improvement comprising generating a signal indicative of a quantity of heat transfer between a first section of said exterior wall and a second section of said exterior wall in thermal communication therewith.

12. In a method according to claim 11, the further improvement comprising generating a signal indicative of a sorbent material temperature $T_M$ having a numerical value expressed according to the mathematical relation $$T_M = (\rho(th_v)C_{pv}/h_v)*dT_v/dt + (h_{insul}/h_v)*(T_v - T_{insul}) - ((th_v)k_v/h_v)*d^2T_v/dx^2 + T_v$$

wherein
$\rho$ is defined as a density of said exterior wall,
$th_v$ is defined as a thickness of said exterior wall,
$C_{pv}$ is defined as a specific heat capacity of said exterior wall,
$k_v$ is defined as a conductivity constant of said exterior wall,
$h_v$ is defined as a heat transfer coefficient of said exterior wall,
$h_{insul}$ is defined as a heat transfer coefficient of said insulating medium,
$T_v$ is defined as an exterior wall temperature,
$T_{insul}$ is defined as a temperature of said insulating medium, and
$dT_v/dt$ is defined as time-wise variation of an exterior wall temperature,
$d^2/T_v/dx^2$ is defined as an axial variation of an axial rate of change of an exterior wall temperature.

13. In a method according to claim 1, the further improvement comprising displaying sorption material characteristic-representative signals for the determination therefrom of sorption material loading characteristics and dysfunction.

14. An apparatus for the sorption treatment of fluids, said apparatus comprising
A. a sorption vessel having an exterior wall, a fluid feed entrance, and a fluid product exit,
B. a sorbent material disposed within said sorption vessel and in thermal communication with said exterior wall, said sorbent material being disposed along a fluid flow path defined by said feed entrance and said product exit, and being of the type suitable for reducing sorbate concentration in a feed fluid,
C. means for determining a thermal characteristic of said sorbent material, said characteristic-determining means comprising first sensing means for generating a signal representative of a temperature of said exterior wall and further comprising control means for processing said temperature representative signal to determine a thermal characteristic of said sorbent material in an interior region along said fluid flow path, and
D. output means in circuit with said characteristic-determining means for generating a signal indicative of said thermal characteristic.

15. An apparatus according to claim 14 wherein said first sensing means comprises a temperature sensing device disposed on said exterior wall for generating a signal representative of a temperature thereof.

16. An apparatus according to claim 14 wherein said first sensing means comprises plural temperature sensing devices circumferentially disposed about said exterior wall for generating signals representative of temperatures thereof.

17. An apparatus according to claim 14 wherein said first sensing means comprises plural temperature sensing devices axially disposed along said fluid flow path on said exterior wall for generating signals representative of temperatures thereof.

18. An apparatus according to claim 14 wherein said control means comprises time variant means in circuit with said first sensing means for generating a signal indicative of time-wise variation of a temperature of said exterior wall.

19. An apparatus according to claim 18 wherein said control means comprises first processing means for generating a signal indicative of a quantity of heat storage in said exterior wall.

20. An apparatus according to claim 19 wherein said control means comprises means for generating a signal representative of a sorbent material temperature $T_M$ having a numerical value expressed according to the mathematical relation $$T_M = (\rho(th_v)C_{pv}/h_v) * dT_v/dt + T_v$$

wherein
$\rho$ is defined as a density of said exterior wall,
$th_v$ is defined as a thickness of said exterior wall,
$C_{pv}$ is defined as a specific heat capacity of said exterior wall,
$h_v$ is defined as a heat transfer coefficient of said exterior wall,
$T_v$ is defined as an exterior wall temperature, and
$dT_v/dt$ is defined as a time-wise variation of an exterior wall temperature.

21. An apparatus according to claim 19 comprising second sensing means for generating a signal representative of a temperature of an insulating medium disposed about said exterior wall and in thermal communication therewith.

22. An apparatus according to claim 21 wherein said control means comprises second processing means in circuit with said second sensing means for generating a signal indicative of a quantity of heat transfer between said exterior wall and an externally-disposed insulating medium.

23. An apparatus according to claim 22 wherein said control means comprises means for generating a signal representative of a sorbent material temperature $T_M$ having a value expressed according to the mathematical relation $$T_M = (\rho(th_v)C_{pv}/h_v)*dT_v/dt + (h_{insul}/h_v)*(T_v - T_{insul}) + T_v$$

wherein
$\rho$ is defined as a density of said exterior wall,
$th_v$ is defined as a thickness of said exterior wall,
$Cp_v$ is defined as a specific heat capacity of said exterior wall,
$h_v$ is defined as a heat transfer coefficient of said exterior wall,
$h_{insul}$ is defined as a heat transfer coefficient of said insulating medium,
$T_v$ is defined as an exterior wall temperature,
$T_{insul}$ is defined as a temperature of said insulating medium, and
$dT_v/dt$ is defined as a time-wise variation of an exterior wall temperature.

24. An apparatus according to claim 19 wherein said control means comprises axial variant means for generating a signal indicative of axial variation of a temperature of said exterior wall.

25. An apparatus according to claim 24 wherein said control means comprises axial heat transfer means for generating a signal indicative of a quantity of heat transfer between a first section of said exterior wall and a second section of said exterior wall in thermal communication therewith.

26. An apparatus according to claim 25 wherein said control means comprises means for generating a signal representative of a sorbent material temperature $T_M$ having a value expressed according to the mathematical relation $$T_M = (\rho(th_v)C_{pv}/h_v)*dT_v/dt + (h_{insul}/h_v)*(T_v - T_{insul}) - ((th_v)k_v/h_v)*d^2T_v/dx^2 + T_v$$

wherein $\rho$ is defined as a density of said exterior wall, $th_v$ is defined as a thickness of said exterior wall, $C_{pv}$ is defined as a specific heat capacity of said exterior wall, $k_v$ is defined as a conductivity constant of said exterior wall, $h_v$ is defined as a heat transfer coefficient of said exterior wall, $h_{insul}$ is defined as a heat transfer coefficient of said insulating medium, $T_v$ is defined as an exterior wall temperature, $T_{insul}$ is defined as a temperature of said insulating medium, and $dT_v/dt$ is defined as a time-wise variation of an exterior wall temperature, $d^2T_v/dx^2$ is defined as an axial variation in an axial rate of change of an exterior wall temperature.

27. An apparatus according to claim 14 wherein said output means includes diagnostic means for the display of sorption material characteristic-representative signals for the determination therefrom of sorption material loading characteristics and dysfunction.

* * * * *